United States Patent [19]

Stadtfeld

[11] Patent Number: 5,580,298

[45] Date of Patent: Dec. 3, 1996

[54] METHOD OF PRODUCING TOOTH FLANK SURFACE MODIFICATIONS

[75] Inventor: Hermann J. Stadtfeld, Rochester, N.Y.

[73] Assignee: The Gleason Works, Rochester, N.Y.

[21] Appl. No.: 312,855

[22] Filed: Sep. 27, 1994

[51] Int. Cl.⁶ .............................. B24B 49/00; B24B 51/00
[52] U.S. Cl. ........................................... 451/1; 451/5
[58] Field of Search ................................... 409/2, 26, 51, 409/38; 451/47, 1, 5, 11, 219, 161

[56] References Cited

U.S. PATENT DOCUMENTS

| | | | |
|---|---|---|---|
| 3,712,000 | 1/1973 | Spear | 451/1 |
| 4,799,337 | 1/1989 | Kotthaus | 451/1 |
| 4,981,402 | 1/1991 | Krenzer et al. | 409/26 |
| 4,982,532 | 1/1991 | Hosoya et al. | 451/47 |
| 5,080,537 | 1/1992 | Takano et al. | 451/47 |
| 5,088,243 | 2/1992 | Krenzer | 51/287 |
| 5,116,173 | 5/1992 | Goldrich | 409/13 |
| 5,136,522 | 8/1992 | Loehrke | 451/5 |
| 5,257,882 | 11/1993 | Stadtfeld et al. | 409/26 |
| 5,310,295 | 5/1994 | Palmateer, Jr. et al. | 409/13 |
| 5,411,431 | 5/1995 | Basstein et al. | 451/47 |
| 5,413,520 | 5/1995 | Feisel | 451/1 |

OTHER PUBLICATIONS

Plotnikov, N. D. and Segal, M. G., "Modeling Bevel and Hypoid Gear–Cutting Processes", *Machines & Tooling*, vol. XLII, No. 11, 1971, pp. 56–59.

Segal, M. G., "Ways of Numerical Program Control Utilization in Machine Tools for Machining Round Teeth of Conical and Hypoid Transmissions", Izvestiya vuzoz. Mashinostroenie, 1985, No. 6, pp. 120–124.

Sheiko, L. I. and Buyanov, N. M., *Structure of the Coordinate Components of Tooth Machining Tools for Conical Gears*, Mezhduzovskii Scientific Symposium "Study of the Precision and Productivity of Tooth Machining Tools and Tools", Saratov Polytechinal Institute, Saratov, 1985, pp. 60–65.

Segal, M. G., *Characteristics of the Components of the Machine Tools with Numerical Program Control for Machining Round Teeth of Conical nad Hypoid Transmissions*, Mezhduzovskii Scientific Symposium "Study of the Precision and Productivity of Tooth Machining Tools and Tools", Saratov Technical Institute, Saratov, 1985, pp. 19–23.

Goldrich, Robert N., "CNC Generation of Spiral Bevel and Hypoid Gears: Theory and Practice", The Gleason Works, Rochester, NY, 1990.

*Primary Examiner*—James G. Smith
*Assistant Examiner*—Derris H. Banks

[57] ABSTRACT

A method of producing flank surface modifications in gear teeth by controlled removal of stock material from a work gear with a tool. The method comprises providing a gear producing machine the tool and work gear being movable with respect to one another along and/or about a plurality of axes. A theoretical basic machine is provided comprising a plurality of machine settings for relatively positioning and moving said tool and work gear with respect to one another. Each of the machine settings is defined as an active setting with each active setting being represented by a function. A desired tooth flank surface modification is determined and defined by a set of coefficients for each of the active settings. The function for each active setting is then determined based upon the respective coefficients for each active setting and the functions are transformed from the theoretical machine to the axes arrangement of the gear producing machine. By this transformation, active settings movement defined on the theoretical machine is carried out on one or more of the axes of the gear producing machine to remove stock material from the work gear with the tool in accordance with the active setting functions of the basic machine.

46 Claims, 6 Drawing Sheets

METHOD OF PRODUCING TOOTH FLANK SURFACE MODIFICATIONS

FIELD OF THE INVENTION

The present invention is directed to the production of gears and the like and in particular is directed to producing gear tooth flank surfaces based upon a theoretical basic gear machine having machine settings active during gear production.

BACKGROUND OF THE INVENTION

In the production of gears, especially bevel and hypoid gears, two types of processes are commonly employed, generating processes and non-generating processes.

Generating processes can be divided into two categories, face milling (intermittent indexing) and face hobbing (continuous indexing). In generating face milling processes, a rotating tool is fed into the workpiece to a predetermined depth. Once this depth is reached, the tool and workpiece are then rolled together in a predetermined relative rolling motion, known as the generating roll, as though the workpiece were rotating in mesh with the theoretical generating gear, the teeth of the theoretical generating gear being represented by the stock removing surfaces of the tool. The profile shape of the tooth is formed by relative motion of the tool and workpiece during the generating roll.

In generating face hobbing processes, the tool and work gear rotate in a timed relationship and the tool is fed to depth thereby forming all tooth slots in a single plunge of the tool. After full depth is reached, the generating roll is commenced.

Non-generating processes, either intermittent indexing or continuous indexing, are those in which the profile shape of a tooth on a workpiece is produced directly from the profile shape on the tool. The tool is fed into the workpiece and the profile shape on the tool is imparted to the workpiece. While no generating roll is employed, the concept of a theoretical generating gear on the form of a "crown gear" is applicable in non-generating processes. The crown gear is that theoretical gear whose tooth surfaces are complementary with the tooth surfaces of the workpiece in non-generating processes. Therefore, the cutting blades on the tool represent the teeth of the crown gear when forming the tooth surfaces on the non-generated workpiece.

The relationship between the workpiece and generating gear can be defined by a group of parameters known as basic machine settings. These basic settings communicate a sense of size and proportion regarding the generating gear and the work piece and provide a common starting point for gear design thus unifying design procedures among many models of machines. The basic settings totally describe the relative positioning between the tool and workpiece at any instant.

Basic machine settings for forming gears are known in the art and one such disclosure of them can be found in Goldrich, "CNC Generation of Spiral Bevel and Hypoid Gears: Theory and Practice" The Gleason Works, Rochester, N.Y., 1990. In this publication, basic machine settings are identified as follows: (1) the radial, S, which is the distance between the cradle axis and the tool axis; (2) the tilt angle, Pi, which defines the angle between the cradle axis and tool axis; (3) the swivel angle, Pj, which defines the orientation of the tool axis relative to a fixed reference on the cradle; (4) the cradle angle, q, which defines the angular position of the tool about the cradle axis; (5) the root angle, $\Sigma$, which sets forth the orientation of the work support relative to the cradle axis; (6) the sliding base, Xb, which is the distance from the machine center to the apparent intersection of the work and cradle axis; (7) the head setting, Xp, which is a distance along the work axis from the apparent intersection of the work and cradle axis to a point located a fixed distance from the workpiece; (8) work offset, Em, which defines the distance between the work axis the cradle axis; (9) rotational position of the workpiece, Wg; and, (10) rotational position of the tool, Wt, which is used in the case of face hobbing. In addition, in generating processes, it is necessary to know the ratio-of-roll, Ra, which is the ratio of the rotation of the work piece to the rotation of the cradle.

In conventional gear forming machines, the cradle angle, work rotation, and tool rotation change during generation while the other settings generally remain fixed. Two notable exceptions to this are helical motion which involves motion of the sliding base, Xb, and vertical motion which is motion in the work offset direction, Em.

Conventional mechanical machines for producing bevel and hypoid gears comprise a work support mechanism and a cradle mechanism which, during generating processes, carries a circular tool along a circular path about an axis known as the cradle axis. The cradle represents the body of the theoretical generating gear and the cradle axis corresponds to the axis of the theoretical generating gear. The tool represents one or more teeth on the generating gear.

The conventional mechanical machine meets the concept of the theoretical basic machine since nearly all machine settings correspond to theoretical basic settings. Such a machine is shown and described in the previously mentioned Goldrich publication. In the mechanical machine, the basic setting for the radial, S, is controlled by an angular machine setting known as the eccentric angle which is commonly denoted by "$\beta$".

In the recent past, gear producing machines have been developed which reduce the number of machine settings necessary to orient a tool relative to a work piece. These machines transform the settings and movements of the conventional mechanical machine to a system of linear, rotational, and pivoting axes which results in a more universal yet simplified machine.

One example of a multi-axis machine is shown in U.S. Pat. No. 5,257,882 to Stadtfeld et al. In this machine, the eccentric angle, swivel angle, tilt angle, and hypoid offset settings have been eliminated but a cradle, carrying an eccentric slide, is still present on the machine.

Another multi-axis or free-form machine is shown in U.S. Pat. No. 4,981,402 to Krenzer et al. This machine comprises six axes of movement, three linear and three rotational, to orient a tool and workpiece with respect to one another. The cradle, eccentric, hypoid offset, and the angular settings to orient the tool have been eliminated. The six axes are controlled by a computer in response to setup and operating parameters of the conventional mechanical gear generating machine. The machine settings from the mechanical machine are transformed into the kinematic relationships between the six axes of the multi-axis machine.

However, while multi-axis machines represent a simplification of the conventional mechanical machines, all design calculation and gear theoretical considerations are still based on the theoretical basic machine model having a plurality of fixed machine settings. This practice has had the practical effect of limiting the available gear making processes of modern multi-axis gear making machines to replications of motions previously available only on older mechanical machines.

Methods have been proposed to modify gear forming and generating motions in order to more precisely control the tooth surface geometry of gears being produced. One such method is disclosed in U.S. Pat. No. 5,088,243 to Krenzer wherein additional motions are introduced which further control grinding processes with a flared-cup grinding wheel. Another method is disclosed in U.S. Pat. No. 5,116,173 to Goldrich in which variations in the location of the generating gear axis as well as variations in the orientation of the tooth surfaces of the generating gear are included in the generating process.

In either of the above methods however, the disclosed modifications would be implemented based on a plurality of fixed settings, of the type available on a conventional mechanical machine, to define the basic flank design. The fixed settings would be superimposed by movements defined directly in terms of the axes of the multi-axis machine without taking into account the axes of the theoretical basic machine. This combination of machine models yields an approximate tooth surface since superimposition of basic theoretical machine motions with actual motions from other machines provides a two-model surface which cannot be accurately represented either by tooth contact analysis or tooth flank surface data.

In any case, to date, gear calculations have been limited due to the fixed settings of the theoretical machine used to make those calculations, and it has never been realized to make gear theoretical considerations based upon all settings of the theoretical gear machine being free or active. Thus, although the multi-axis machine is capable of orienting the tool and work piece in almost any position relative to one another, the discovery of additional motions or freedoms has been constrained by the fixed settings of the theoretical basic machine.

SUMMARY OF THE INVENTION

The inventive method comprises providing a gear producing machine having a work gear rotatable about a work axis and a tool rotatable about a tool axis with the tool and work gear being movable with respect to one another along and/or about a plurality of axes. The invention also provides a theoretical basic machine comprising a plurality of machine settings for relatively positioning and moving said tool and work gear with respect to one another. Each of the machine settings is defined as an active setting with each active setting being represented by a function.

A desired tooth flank surface modification is determined by defining a set of coefficients for each active setting and the function for each active setting is then determined based upon the respective coefficients for each active setting. The functions may be generally expressed as:

$$f(\theta) = a_0 + \frac{a_1}{1!} * \Delta\theta + \frac{a_2}{2!} * \Delta\theta^2 + \frac{a_3}{3!} * \Delta\theta^3 + \frac{a_4}{4!} * \Delta\theta^4$$

where:

$f(\theta)$=function defined in terms of lead motion, $\theta$=lead motion, $a_0$, $a_1$, $a_2$, $a_3$, $a_4$=coefficients to control the relationship between the particular axis and the lead motion.

The functions are transformed from the theoretical basic machine to the axes arrangement of a gear producing machine. By this transformation, active settings movements defined on the theoretical machine can be carried out on one or more of the axes of the gear producing machine to remove stock material from the work gear with the tool in accordance with the active setting functions of the basic machine. The present inventive method applies to generating and non-generating processes.

The active setting equations of the theoretical machine may be represented by single functions applied along the entire length of the tooth surface to describe the entire length of the tooth surface. However, the present invention contemplates two or more lengthwise sections on the tooth surface and applying separate functions to each section.

The present invention encompasses additional freedoms in gear development by providing for theoretical basic machine motions by considering all basic machine axes, which previously had been static settings, to be active and to be used to describe relative motions between to tool and work gear.

In addition, with the present invention, the practice of heretofore combining actual and/or mathematical models, to describe tooth surface modifications, is overcome. One model describing all tooth surface changes now exists thus allowing accurate tooth contact analysis and flank surface data to provide a clear representation of a desired tooth surface prior to the actual manufacturing process.

DETAILED DESCRIPTION OF THE PREFERRED EMBODIMENTS

The present invention will now be discussed with reference to the accompanying Drawings.

The present invention provides a method of modifying the tooth surfaces of a work gear and is based upon the discovery that by removing the fixed constraint of basic settings in the theoretical basic gear machine, tooth surfaces of the theoretical generating gear as well as the relationship between the work gear and generating gear can be modified by replacing the fixed settings with functions that permit the settings to vary thus influencing the surface geometry of the work gear teeth.

Figure 1:
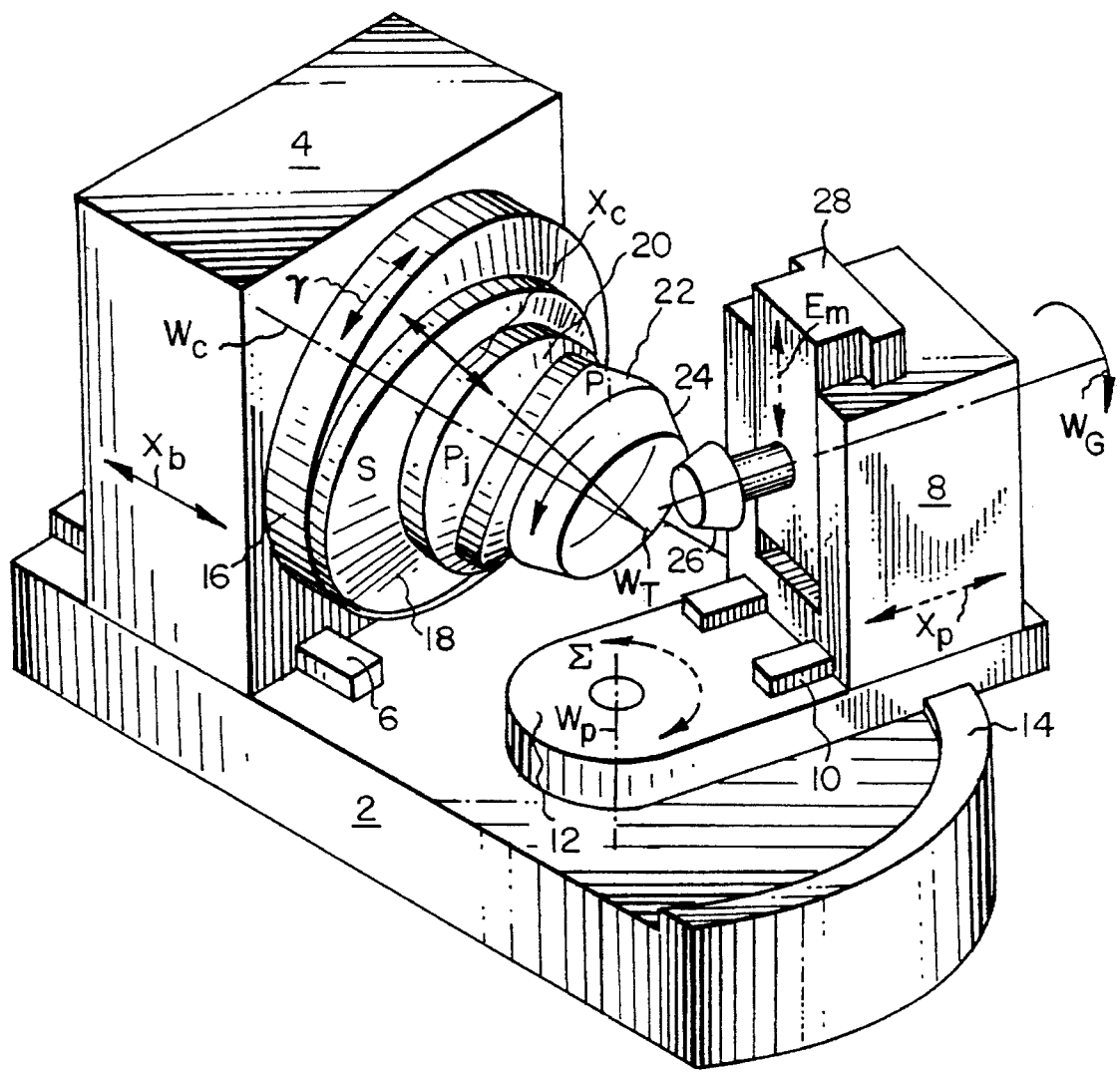
FIG. 1 is a schematic representation of a theoretical basic gear machine which is also representative of a conventional mechanical machine.

FIG. 1 illustrates a theoretical basic gear machine comprising a machine base 2, a tool head 4 linearly movable on ways 6 attached to machine base 2. The basic machine also includes a work head 8 linearly movable on ways 10 attached to work table 12 which is movable in an arcuate path on way 14 about pivot axis $W_P$.

Mounted on tool head 4 is a cradle 16 which is rotatable about cradle axis $W_c$ and attached to cradle 16 is a series of adjustable drums 18, 20, and 22 which control the eccentric, swivel, and tilt angles respectively. These drums are set to position the tool 24, rotatable about tool axis $W_T$, in an appropriate manner with respect to the work gear 26.

Work head 8 includes slide 28 which in turn carries work gear 26 rotatable about work axis $W_G$. Slide 28 is positioned and set to the desired hypoid offset distance.

The axes of the theoretical machine all have a gear theoretical meaning. The theoretical gear machine preferably comprises eight axes although more or less could be present and are within the scope of the present invention. Movement of tool head 4 on ways 6 defines the sliding base setting, Xb, to control the depth of cut. Positioning of slide 28 controls the vertical motion or hypoid offset, Em. Movement of work head 8 along ways 10 controls head setting or pitch cone setting, Xp. Motion of the work table 12 about axis $W_P$ sets the root angle, $\Sigma$. Rotational adjustment of drum 18 (eccentric angle) adjusts the spiral angle of the work gear. Rotational adjustment of drums 20 and 22 sets the position of the cutter axis, swivel (angle Pj) and tilt (angle Pi) respectively, to adjust the flank profile and influence lengthwise crowing and mesh crowning. Rotation of the cradle 16 provides rotation of the generating gear (angle $\gamma$) about axis $W_C$. Axes $W_T$ and $W_G$ provide for rotation of the tool and work gear respectively. If a gear is to be produced by a generating method, then a ratio-of-roll, Ra, which is the ratio of work gear rotation to cradle rotation, is also needed.

Figure 2:
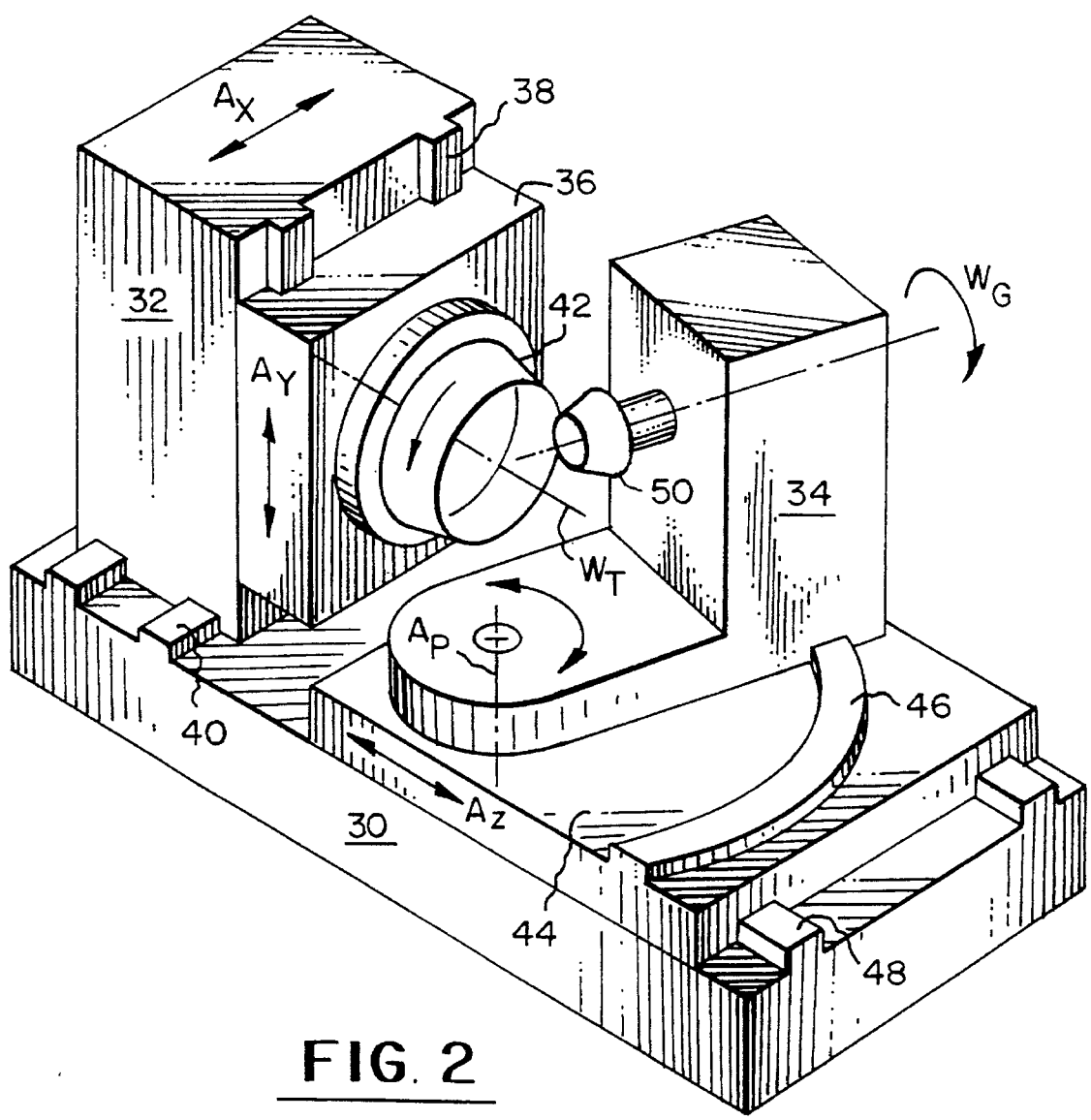
FIG. 2 is a schematic representation of a free-form six-axes gear manufacturing machine.

FIG. 2 schematically represents a free-form gear manufacturing machine of the type disclosed by the previously mentioned U.S. Pat. No. 4,981,402. This machine comprises a machine base 30, tool head 32, and work head 34. Tool slide 36 is mounted for linear movement ($A_y$) to tool head 32 via ways 38 and tool head 32 is mounted for linear movement ($A_x$) to machine base 30 via ways 40. Tool 42 is mounted to tool slide 36 and is rotatable about tool axis $W_T$.

Work head 34 is mounted for arcuate (pivoting) movement ($A_p$) to work table 44 via way 46 and work table 44 is mounted for linear movement ($A_z$) to machine base 30 via ways 48. Work gear 50 is mounted to work head 34 and is rotatable about work gear axis $W_G$.

Figure 4:
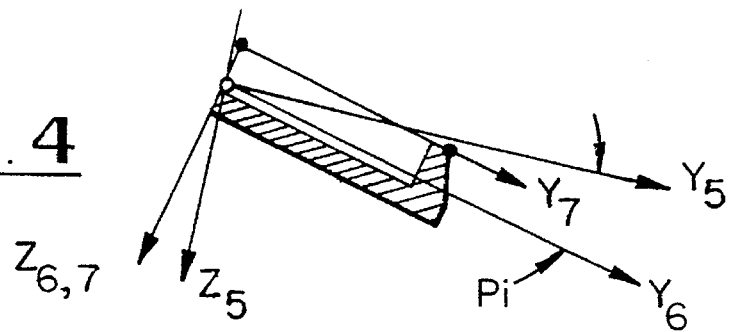
FIG. 4 shows a mathematical model of the theoretical basic machine viewed along coordinates $Y_5$–$Z_5$ of FIG. 3.
Figure 3:
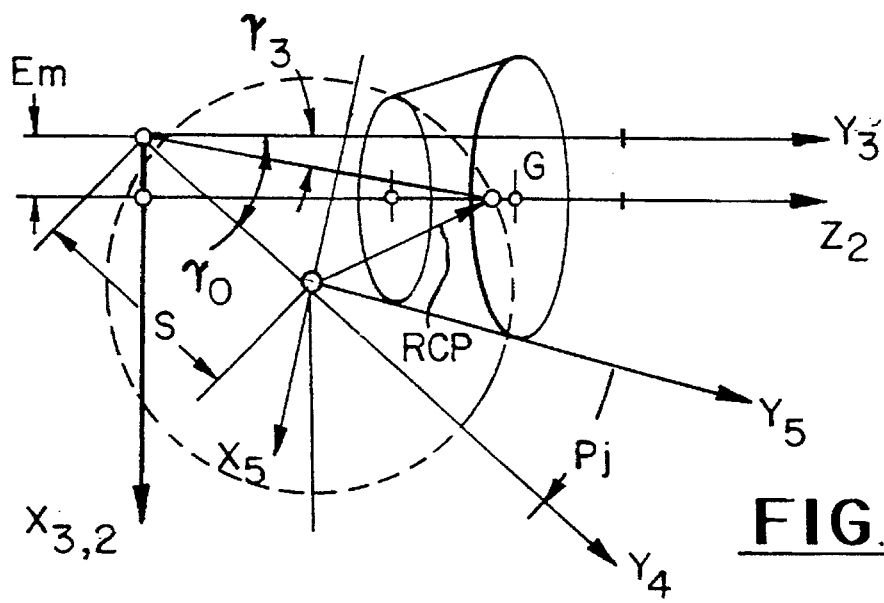
FIG. 3 shows a mathematical model of the theoretical basic machine from a front view perpendicular to the machine cradle.
Figure 5:
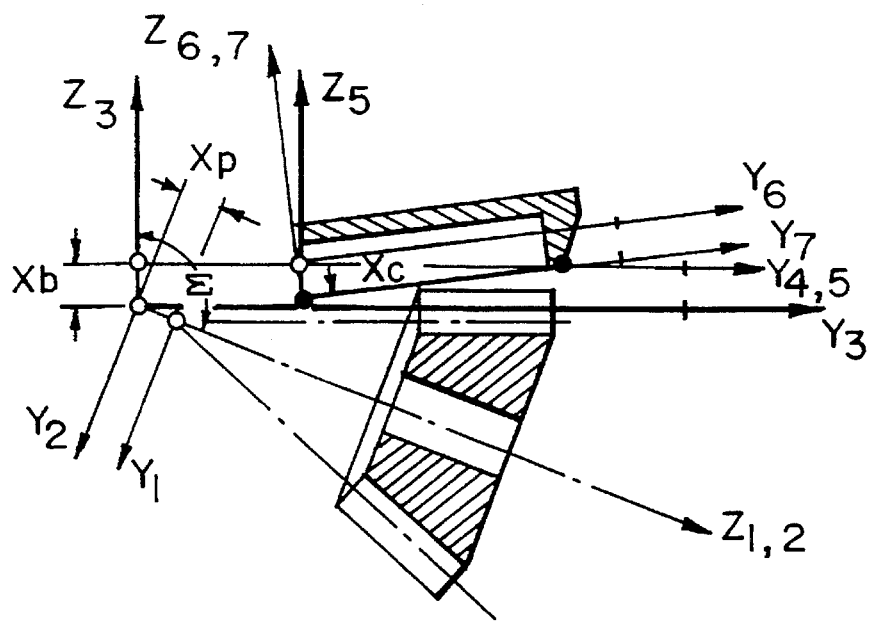
FIG. 5 shows a mathematical model of a top view of the theoretical basic machine.

FIGS. 3, 4, and 5 show three different views of a mathematical model of the theoretical basic machine. FIG. 3 shows the front view perpendicular to the cradle 16 of FIG. 1. Axis $Z_3$ points perpendicularly into FIG. 3. The setting Em represents the hypoid offset, setting S is the eccentricity, RCP is the cutter radius, Pj is the cutter tilt orientation and $\gamma_O$ is the mean cradle roll position.

FIG. 4 shows a view perpendicular to the coordinate system $Y_5$–$Z_5$ of FIG. 3. The angle Pi between axes $Y_5$ and $Y_6$ represents the cutter head tilt angle.

FIG. 5 shows a top view of the basic theoretical machine. The setting Xb is the length adjustment between the work gear and the cutter head column, setting Xp adjusts the cone distance, $\Sigma$ is the work cone (machine root angle) adjustment, and Xc is the cutter head axial adjustment.

Figure 6:
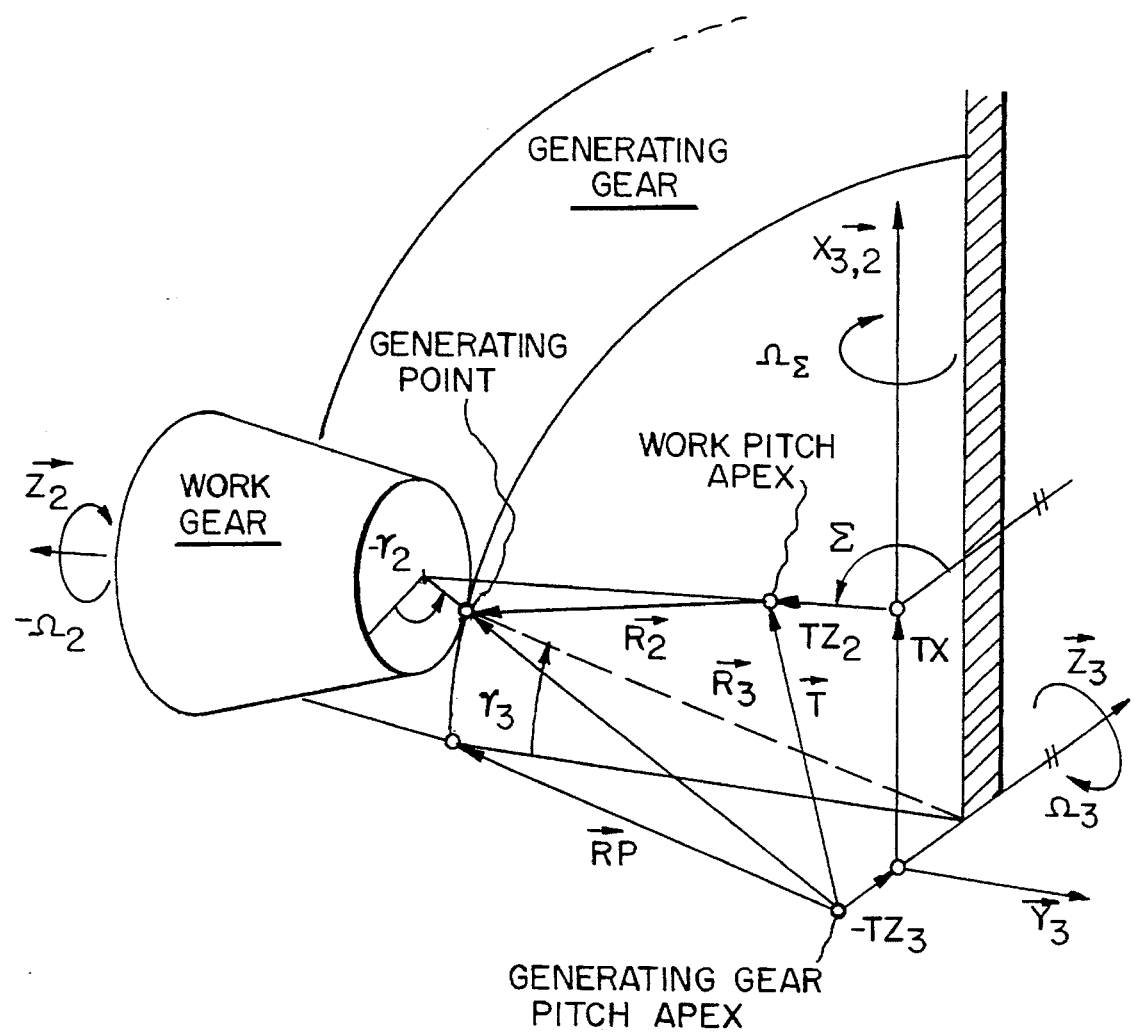
FIG. 6 illustrates a three-dimensional view of a generating system.

FIG. 6 shows a three dimensional view of a generating system. It is the conversion of the basic machine system in a vectorial form which allows a vectorial solution to the Gearing Law (defined below). The generating gear is connected on axis $Z_3$ and rotates with $\gamma_3$. The pitch apex of the generating gear is located $-TZ_3$ from the coordinate origin.

The work gear is connected to axis $Z_2$ and rotates with $-\gamma_2$. The pitch apex of the work gear is located $TZ_2$ from the coordinate origin. The hypoid offset is TX. The vector T keeps the work gear positioned relative to the generating gear. Each component of T can change according to a fourth order function. This is relative to the basic machine (FIG. 1) movements of helical motion, Xb, head setting, Xp, and hypoid offset, Em. The cone adjustment, $\Sigma$, can change its value according to a fourth order function which is a rotation in direction $\Omega_\Sigma$. RP is the vector to a principle point of the flank surface of the generating gear.

The solution of the Gearing Law finds the generating point. The Gearing Law is expressed as:

$$|N_3 \times R_3| = N_2 \times R_2 | \cdot Ra$$

For a defined situation such as an external gear pair, a maximum of two solution vectors can be found and only one is physically meaningful. This means for the solution of the Gearing Law, a radius vector, $R_3$, rotating around axis $Z_3$ with a normal vector $N_3$ can only in one angular position $\gamma_3$ define a radius vector $R_2$ which can rotate around axis $Z_2$ such that $R_2$ has a colinear normal vector $N_2$ and fulfills, for an infinite small rotation $-\gamma_2$, the requirement of the ratio Ra to $\gamma_3$ if $R_2$ and $R_3$ stay in contact for this small rotation.

Therefore, the vector RP is rotated around $Z_3$ about $\gamma_3$. This makes RP to the solution vector $R_3$. $R_2$ is the solution vector in the work gear system $(X_2, Y_2, Z_2)$. $\gamma_2$ is the angle to rotate the work gear generation point to bring it in the outgoing position ($\gamma_3 \times$Ra where Ra is the ratio of roll, which can be a fourth order function, related to the cradle roll $\gamma$).

Gear design calculations based on the theoretical gear machine are converted into practice by transforming the design results to a real cutting or grinding machine. In the case of using a mechanical cradle style machine, it is relatively simple since the cradle style machines meets the same concept as the theoretical basic machine.

In the case of the free-form machine of FIG. 2, transformation of the basic machine data is more complex. All of the settings of the basic machine have to be converted into kinematic relationships between the axes of the free-form machine. Also, the kinematic relationships in the basic machine like the constant rolling motion or a helical motion (in the direction of ways 6 in FIG. 1) have to be converted. The rolling motion of the work will not be constant anymore and the helical motion is normally not oriented in the length direction of the machine and its direction is changed during the generating roll. Transformation from a basic or mechanical machine to a free-form machine is known and a further discussion of the transformation from mechanical machine settings to the axes arrangement of the free-form machine can be found in previously mentioned U.S. Pat. No. 4,981,402.

Any tooth surface modifications developed, such as those modifications previously described in U.S. Pat. No. 5,088,243 or 5,116,173, must be capable of being defined on the theoretical basic machine in order for the modifications to be exactly implemented, either on a mechanical machine or when transformed to a free-form machine. Tooth surface modifications not completely definable due to fixed setting constraints of the theoretical machine must be, at best, approximated and superimposed onto the motions for generating the basic tooth form. Therefore, the desired modified tooth surface will not be precisely formed.

Due to the different axes configuration of the free-form machine and theoretical basic machine, tooth surface modifications defined by axes movement on the free-form machine must either be superimposed on a gear manufacturing process transformed from basic machine settings, or, must be defined in terms of the theoretical basic machine which, with the constraints of fixed settings, may also lead to a modified tooth surface approximation being the best attainable surface.

Whether tooth surface modifications are superimposed or approximated, no reliable tooth contact analysis and no flank surface data is obtainable since the tooth surface modification data does not refer to one physical machine or mathematical model. A mixture of two models, theoretical superimposed with free-form motions or theoretical combined with constrained approximations, is not a precise and stable definition of a flank surface and a generating process. In the case of superimposing an analytical correction to a model or mixing two models, the Gearing Law is only applied for the basic tooth form and not for the correction and not for the superimposed result (basic flank plus correction). In situations prior to the manufacture of a gear or pinion, it has not been possible to know if undercut, interference, or secondary cuts would appear and destroy the flank surface and hence, the part. Staying in one model allows the Gearing Law to be applied which is the most economical procedure of gear calculation since flank surface calculation, contact analysis, and undercut or interference checks are possible.

It has now been discovered that by removing the constraints of the fixed settings on the theoretical basic machine, tooth surface modifications may be exactly defined in terms of one or more settings of the basic machine. In other words, the present invention presents all settings of the theoretical machine as active or alive.

The present invention allows the generating gear to change its flank form and the work gear to change its position and angle while rolling. In the theoretical basic machine of the prior art, the generating gear tooth flank as well as the work gear position and angle were fixed. These limitations were likewise present on actual mechanical machines, since these machines correspond to the theoretical basic model, and on free-form machines since theoretical basic settings are transformed to the axes arrangement of the free-form machines.

Since the axes of the theoretical basic machine all have a gear theoretical meaning, each axes is now represented by a function. The step from a geometric machine to a kinematic basic machine requires a connection of all the machine axes to a lead motion, for example, the cradle rotation angle or work gear rotation angle, with a kinematic relationship. The polynomial should be at least a second order equation and preferably at least a fourth order equation. The following general formula equation shows a preferred function:

$$f(\theta) = a_0 + \frac{a_1}{1!} * \Delta\theta + \frac{a_2}{2!} * \Delta\theta^2 + \frac{a_3}{3!} * \Delta\theta^3 + \frac{a_4}{4!} * \Delta\theta^4$$

where:

$f(\theta)$=function defined in terms of lead motion, $\theta$=lead motion, $a_0, a_1, a_2, a_3, a_4$=coefficients to control the relationship between the particular axis and the lead motion.

While a polynomial function is preferred, the present invention may also be described by other functions, such as exponential, logarithmic, or trigonometric.

To arrive at an entire kinematic working basic machine, it is also necessary to define the ratio-of-roll between the generating gear and the work gear as a polynomial function of a leading motion. The polynomial should be at least a second order equation and preferably at least a fourth order equation.

$$Ra = Ra_0 * \left(1 - \frac{Ra_1}{2} * \Delta\theta - \frac{Ra_2}{6} * \Delta\theta^2 - \frac{Ra_3}{24} * \Delta\theta^3 - \frac{Ra_4}{120} * \Delta\theta^4\right)$$

wherein:

Ra=the ratio-of-roll, $Ra_0, Ra_1, \ldots$ =coefficients to control the relationship between the tool and work gear, $\Delta\theta$=lead motion.

In generating processes, using the angle of cradle rotation as the lead function, the following nine basic settings may be activated or "modified" during generation: modified roll (Ra), helical motion (Xb), vertical motion (Em), modified eccentricity (S), modified cone distance (Xp), modified tilt (Pi), modified swivel (Pj), modified cutter head axial adjustment (Xc), and, modified root angle ($\Sigma$).

Basic machine generating motions may be divided into two groups, those influencing the relationship between the work gear and generating gear while rolling, and those influencing the shape of the generating gear tooth flank. The following relationship describes those motions (helical motion Xb, vertical motion Em, modified cone distance Xp, and modified root angle $\Sigma$) which influence the work gear and generating gear during rolling:

$$AS = AS_0 + AS_1 * \Delta\theta + \frac{AS_2}{2} * \Delta\theta^2 + \frac{AS_3}{6} * \Delta\theta^3 + \frac{AS_4}{24} * \Delta\theta^4$$

$$VAS = AS_1 + AS_2 * \Delta\theta + \frac{AS_3}{2} * \Delta\theta^2 + \frac{AS_4}{6} * \Delta\theta^3$$

wherein:

AS=the particular active setting,

VAS=first derivative of the active setting, $AS_0, AS_1, \ldots$ =coefficients to control the relationship between the tool and work gear, $\Delta\theta$=lead motion.

The first derivative, VAS, of the active setting equation accounts for the velocity of the position change described by equation AS. In generating processes, ratio-of-roll also modifies the configuration between the generating gear and the work gear. The equation representing the ratio-of-roll, Ra, relationship is shown above. As for those generating motions which influence the flank surface of the generating gear (modified eccentricity S, modified tilt Pi, modified cutter head axial adjustment Xc, and, modified swivel Pj), the following equation describes their relationship:

$$AS = AS_0 + AS_1 * \Delta\theta + \frac{AS_2}{2} * \Delta\theta^2 + \frac{AS_3}{6} * \Delta\theta^3 + \frac{AS_4}{24} * \Delta\theta^4$$

$$VAS = \left(AS_1 + AS_2 * \Delta\theta + \frac{AS_3}{2} * \Delta\theta^2 + \frac{AS_4}{6} * \Delta\theta^3\right) * \Omega_T$$

wherein:

AS=the particular active setting,

VAS=first derivative of the active setting, $AS_0, AS_1, \ldots$ =coefficients to control the relationship between the tool and work gear, $\Delta\theta$=lead motion, and, $\Omega_T$=velocity of lead motion.

As with the relationship of the generating gear and work gear discussed above, the equation representing the modification of the generating gear tooth flank surface is accompanied by its first derivative equation, VAS, which is multiplied by the velocity of the lead rotation.

In non-generated gears, tooth flank surfaces may be produced according to known form-cutting methods such as flared-cup cutting and grinding. The tooth flank surface is "generated" by moving the tool through the tooth slot along a circular path. This is a feed motion. According to the present invention, the theoretical basic machine having active or "living" axes can provide for any kind of tooth flank modification with the lead motion being, for example, the tool feed motion. The relationship for non-generating processes can be expressed as:

$$AS = AS_0 + AS_1 * \Delta\theta + \frac{AS_2}{2} * \Delta\theta^2 + \frac{AS_3}{6} * \Delta\theta^3 + \frac{AS_4}{24} * \Delta\theta^4$$

$$VAS = \left( AS_1 + AS_2 * \Delta\theta + \frac{AS_3}{2} * \Delta\theta^2 + \frac{AS_4}{6} * \Delta\theta^3 \right) * \Omega_T$$

wherein:

AS=the particular active setting,

VAS=first derivative of active setting, $AS_0$, $AS_1$, . . . =coefficients to control the relationship between the tool and work gear, $\Delta\theta$=lead motion, $\Omega_T$=velocity of lead motion.

Of course in non-generating processes there is no generating roll and, therefore, no ratio-of-roll. However, work gear rotation, $W_G$, must be taken into consideration and the above equation should also be applied to the work gear rotation in relationship to the lead motion. Other than the work gear rotation, the remaining active settings comprise helical motion (Xb), modified hypoid offset (Em), modified eccentricity (S), modified cone distance (Xp), modified tilt (Pi), modified swivel (Pj), modified cutter head axial adjustment (Xc), and, modified root angle ($\Sigma$).

It should also be understood that since no generating roll is present in non-generating processes, there is no corresponding relationship between a generating gear and a work gear. Hence, theoretical basic machine axes motions need only set forth the relationship between the tool and work gear in terms of those axes motions which effect the flank surface of the "generating gear," i.e. crown gear. Nearly all generating gear flank surface modifications can be described with less than the nine active axes named above and preferably only four axes are required.

Two groups of four axes may be defined to completely describe flank surface modifications of the generating gear in non-generating processes. The first group comprises helical motion (Xb), modified hypoid offset or vertical motion (Em), modified cone distance (Xp), and modified root angle ($\Sigma$). The second and preferred group comprises helical motion (Xb), modified eccentricity (S), modified cone distance (Xp), and modified root angle ($\Sigma$).

Regardless of the manner in which the tooth flank surface is formed, i.e. generated or non-generated, the present inventive method is preferably carried out by defining the desired tooth surface geometry by a series of calculation points. With an equation to the fourth order, for example, five unknowns ($a_0$, $a_1$, $a_2$, $a_3$, and $a_4$) are present in the active setting equations. Therefore, five calculation points are required to provide the same number of unknowns. Of course it can be seen that regardless of the order of the equation, the number of tooth surface calculation points will equal the number of unknowns in the equation.

Figure 7:
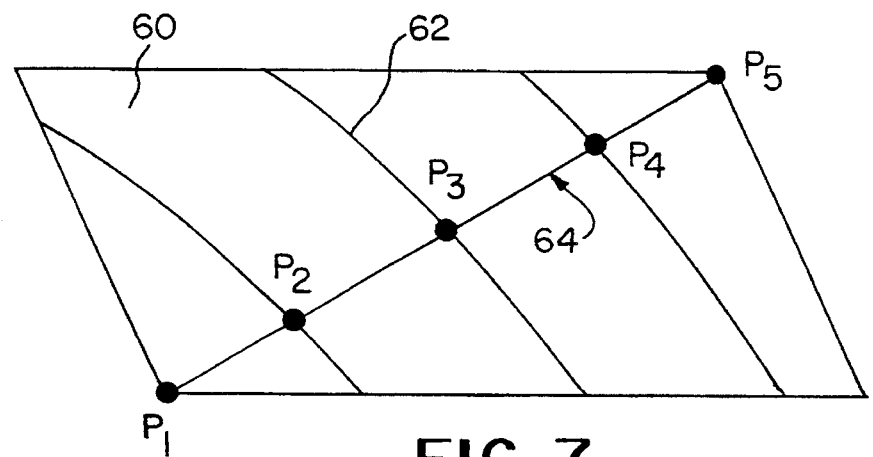
FIG. 7 illustrates a tooth flank surface with calculation points located thereon.

The classic gear calculation requires, starting with the basic parameters, a calculation of the machine setup based on one point, normally the tooth flank center point (P3 in FIG. 7, for example). Since the present invention uses a kinematic function to define machine settings, it is possible to have a flank surface which is not defined from one calculation point. In the case of a fourth order function, five calculation points allow the five parameters of the function to be defined.

FIG. 7 shows a tooth flank surface 60 having contact or generation lines 62 and a path of contact 64. If the active setting equation AS is to the fourth order, thus having five unknowns, five calculation points P1–P5 are needed. Since the tooth surface is a generated surface, the active settings are modified roll (Ra), helical motion (Xb), vertical motion (Em), modified eccentricity (S), modified cone distance (Xp), modified tilt (Pi), modified swivel (Pj), modified cutter head axial adjustment (Xc), and, modified root angle ($\Sigma$).

Depending on the desired tooth surface at each point, calculation points P1–P5 are assigned a respective value for each of the eight axes thus yielding five calculation point values for each of Ra, Xb, Em, S, Xp, Pi, Pj, Xc, and Z along the length of the tooth surface. In other words, each calculation point may have as many as eight components since there are eight active axes. It is to be understood that the axes may have a value of zero at one or more of the calculation points.

Each active setting equation, AS, is then solved using the respective calculation points value for the particular axis to determine the coefficients $a_0$–$a_4$. This may be accomplished in any known manner with the well known Gauss algorithm being a preferred method. For example, the modified eccentric, S, would yield calculation points S(P1), S(P2), S(P3), S(P4), and, S(P5) along the tooth length for a given tooth surface geometry. With these values, coefficients $S_0$, $S_1$, $S_2$, $S_3$, and, $S_4$ would be calculated as stated above. The equations for the modified eccentric, S, would be expressed as follows:

$$S = S_0 + S_1 * \Delta\theta + \frac{S_2}{2} * \Delta\theta^2 + \frac{S_3}{6} * \Delta\theta^3 + \frac{S_4}{24} * \Delta\theta^4$$

$$VS = \left( S_1 + S_2 * \Delta\theta + \frac{S_3}{2} * \Delta\theta^2 + \frac{S_4}{6} * \Delta\theta^3 \right) * \Omega_T$$

In this example, $\Delta\theta$ would preferably be the lead angle of the cradle roll and $\Omega_T$ would then be the cradle rotational velocity.

It should be understood that the present invention is not limited to the determination of coefficients $a_0$–$a_4$ by use of identification points as discussed above. For example, the coefficients may be determined by defining the contact characteristics of the desired gear pair, or, by defining ease-off in conjunction with a corrective matrix in combination with a least squares method.

The above example applies the active setting equations of the theoretical machine along the entire length of the tooth surface as seen in FIG. 7. However, with a single function describing an entire tooth surface, changes to the function in an effort to influence the tooth ends, for example, may have undesirable effects on the center portion of the tooth. Therefore, the present invention contemplates two or more lengthwise sections on the tooth surface as shown by FIG. 8 (which comprises three sections) and applying separate functions to each section.

In this embodiment, the tooth surface of each section may be described by a separate set of active setting equations. To retain continuity between the sections, the ending calculation point in one section may be utilized as the starting point in the next section. It is to be understood that the lengthwise dimension of the sections need not be equal.

Figure 8:
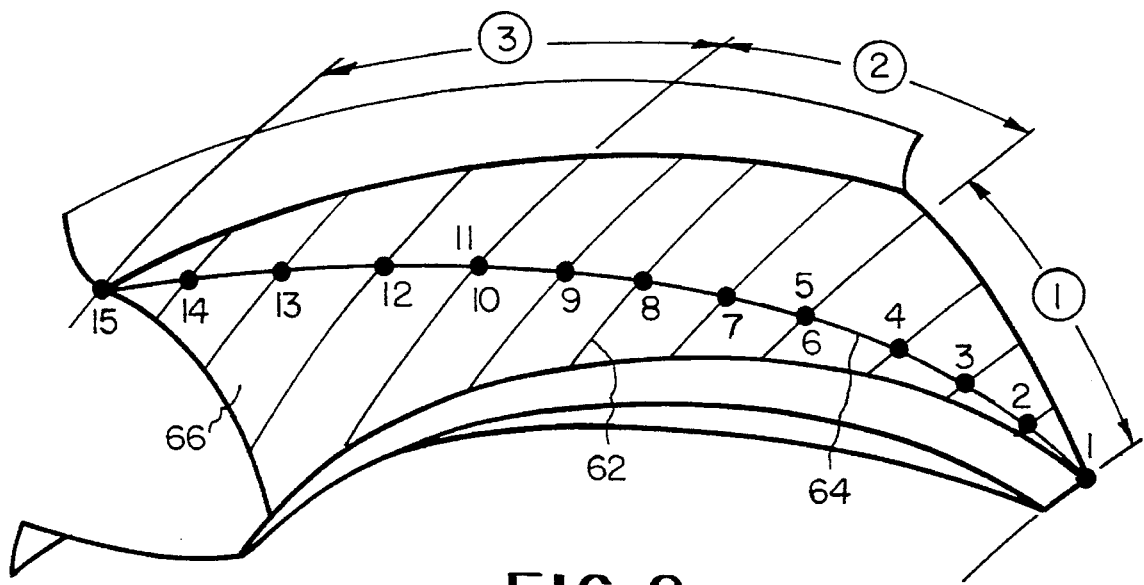
FIG. 8 illustrates a tooth surface comprising a plurality of individually modified lengthwise sections.

In FIG. 8, section 1 is the heel end of tooth flank surface 66. The heel is the entrance area of the tooth flank. The aim of a correction (modification) to the heel end would be to reduce noise due to impact of first contact with a mating tooth.

Section 2 is the center area of tooth flank surface 66. This area should transmit the motion with a small motion error under load.

Section 3 is the toe end of tooth flank surface 66 and is the exit area where the contact with the actual mate tooth ends. The aim of a correction in this section would be to prevent edge contact and provide a high contact ratio with minimal motion error.

For an optimal use of the flank surface, the coefficients of the setting functions can be calculated separately for each section. The first five calculation points (1–5) are chosen along the generating path. This delivers the first set of fourth order functions for Section 1.

The coefficients of Section 2 can also be defined by five points (6–10) along the generating path. To match the last portion of the contact line of Section 1 with the first portion of the contact line of Section 2, points 5 and 6 can be identical.

The same procedure described with respect to Sections 1 and 2 can be applied to points 11–15 of Section 3. To match the last portion of the contact line of Section 2 with the first portion of the contact line of Section 3, points 10 and 11 can also be identical.

It is to be understood that, although preferred, the invention is not to be limited to having the last identification point in one section be identical to the first identification point in an adjacent section. The present invention also contemplates having functions in adjacent sections overlap for a distance in either or both sections in order to maintain continuity. Also, the present invention includes functions in adjacent sections having no common point of intersection.

To get a smooth flank surface (steady surface after the second derivative), a first step may comprise all 15 points describing an outgoing basic flank, as described by center point 8. In this case, all coefficients except the zero order do not exist, i.e. they are zero. All zero order coefficients of the three sections would be the same. The second step can apply tooth surface modifications which activates some or all of the coefficients in one or more of the sections.

It can also be appreciated, on a multi-section tooth surface, that some sections may be modified while other sections may comprise no surface modifications (zero surface modification) beyond the generated surface formed by the basic machine axes settings (zero order only). For example, in a three-section tooth surface, the first and third sections may be modified in some manner and the middle section may comprise no modifications at all.

Figure 9:
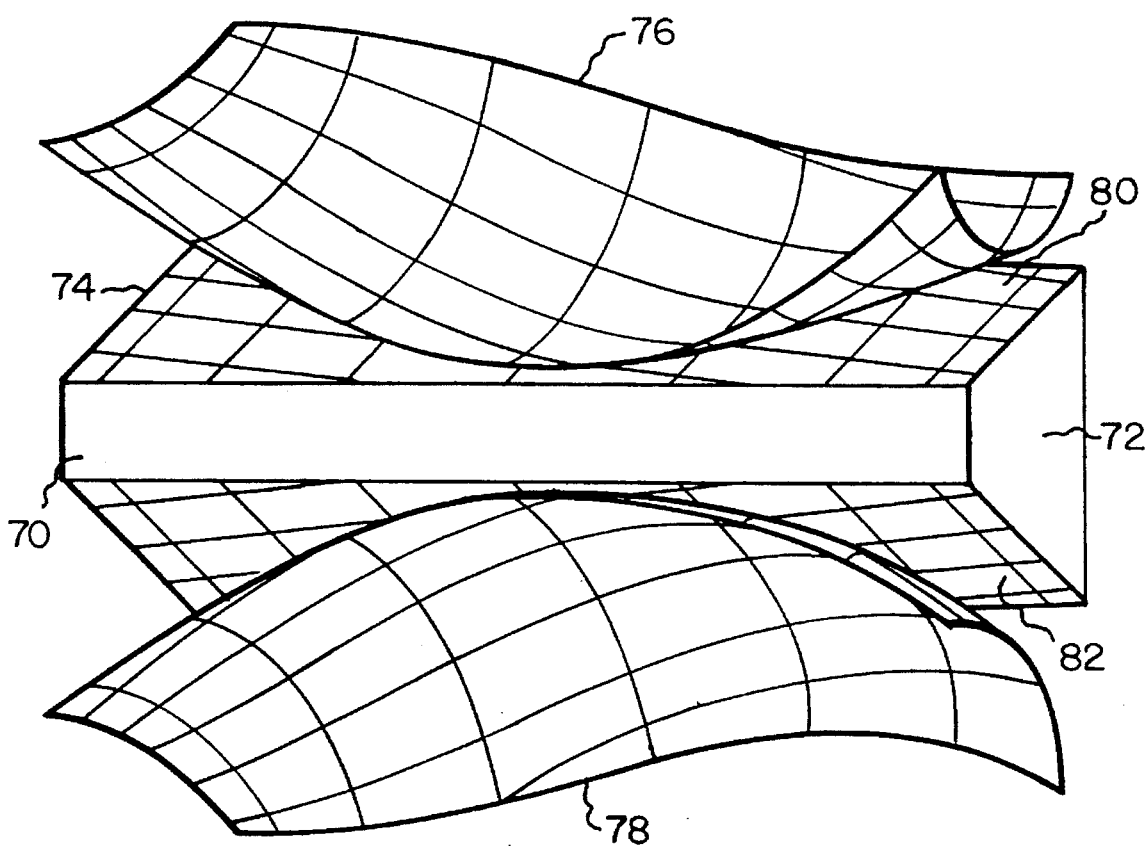
FIG. 9 shows a tooth surface modification according to the present invention.

FIG. 9 shows the displacement of a flank correction where 70 is the topland, 72 the toe, and 74 the heel of a bevel gear tooth. Both corrections of the pinion and gear member are mathematically converted and presented in the gear tooth of FIG. 9. A kinematic exact or conjugate pairing would have no displacement. The topographies of FIG. 9 show the difference of modified or optimized flank surfaces 76, 78 to conjugate ones 80, 82.

The most difficult case of a correction is an exotic higher order flank modification of the pinion convex and gear concave pairing together with any other flank modification of the pinion concave and gear convex pairing if the pinion and gear are produced in a completing process which means the tool forms or generates both flanks (convex and concave) at the same time.

To realize the modulation of FIG. 9 precisely on the surface of the pinion flank, the basic machine settings of helical motion Xb, eccentricity S, swivel Pj, tilt Pi, pitch cone distance Xp, and machine root angle $\Sigma$ must be activated with a function, preferably of the fourth order although the invention contemplates a second order as a minimum. Since all the axes of the basic machine have a gear theoretical meaning, the surfaces in FIG. 9 can be broken down into a fourth order pressure angle modification (Pj, and Pi in FIG. 1), a fourth order spiral angle modification (S in FIG. 1), a fourth order cone distance modification (Xp in FIG. 1), a fourth order tooth thickness modification effected by a fourth order helical motion (Xb in FIG. 1), a defined fourth order root line modification ($\Sigma$ in FIG. 1), and a fourth order ratio-of-roll modification (Ra). Preferably, the tooth flank of FIG. 9 is divided into three sections and the functions applied separately to each section as discussed in reference to FIG. 8.

None of the axes q, S, Pj, and Pi of FIG. 1 are available in the free-form machine of FIG. 2. The axes Xb, Xp, Em, and $\Sigma$ of FIG. 1 have a different meaning than the correspondingly positioned orthogonal axes ($A_x$, $A_y$, $A_z$) and pivot axis ($A_p$) of the free-form machine of FIG. 2. Prior to the present invention, the displacement functions of FIG. 9 could just be approximated by making the conjugate calculation with the basic machine model and superimpose this with a modulation of the free-form machine (FIG. 2) motions. With superimposing, there exists no tooth contact analysis and no flank surface data which refer to one physical machine or one mathematical model. A mixture of two models or a model superimposed with analytical functions is not a precise and stable definition of a flank surface and a generating process.

A superimposition of two models or a model and an analytical function gives no information whether the resulting tooth surface can be machined. This means interferences, undercuts, or secondary cuts may destroy portions of the flank surface since the Gearing Law can be applied to only one model. Furthermore, it is more efficient to produce an optimal tooth surface design, including corrections, in one model.

The modification shown in FIG. 9 is the result of a consideration to reduce rolling noise, lower the sensitivity and improve the load capacity. With the methods of the prior art, it has not been possible to produce two corresponding functions in a completing process to form the modulations in FIG. 9.

The present invention makes it is possible to produce tooth flank length curvature other than circular in single (intermittent) indexing processes and other than cycloidal in continuous indexing (face hobbing) processes. For example, it is possible to grind a form-cut gear with a lead function of a cycloid in a single indexing process. It is also possible to grind gears which were produced by face hobbing since an appropriate lead function can direct the grinding wheel to follow the cycloidal tooth length form of the cut gear.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of producing flank surface modifications in gear teeth by controlled removal of stock material from a work gear with a tool, said method comprising:

providing a gear producing machine, said machine having a work gear rotatable about a work axis and a tool rotatable about a tool axis, said tool and said work gear being movable with respect to one another along and/or about a plurality of axes, providing a theoretical basic machine comprising a cradle and including a plurality of machine axes for relatively positioning and moving said tool and work gear with respect to one another, each of said axes representing a basic machine setting having a gear theoretical meaning, defining each of said plurality of machine settings as an active setting with each said active setting being represented by a function, defining a desired tooth flank surface modification by determining a set of coefficients for each of said active settings indicative of said modification, determining said function for each active setting based upon said coefficients for said each active setting, transforming each active setting function from said theoretical machine to the axes arrangement of said gear producing machine whereby active settings movement defined on said theoretical machine is carried out on one or more of the axes of said gear producing machine, removing stock material from said work gear with said tool in accordance with said active setting functions.

2. The method of claim 1 wherein said determining coefficients comprises selecting a plurality of identification points on said flank surface, the position of each of said points being described by a position value for each of said machine settings, and, determining said coefficients based on said position values.

3. The method of claim 1 wherein said identification points are located along a path of contact on said tooth flank surface.

4. The method of claim 1 wherein each said active function is a function to at least the second order.

5. The method of claim 4 wherein each said active function is a function to at least the fourth order.

6. The method of claim 1 wherein said controlled removal of stock material is a generating process.

7. The method of claim 6 comprising at least nine active settings on said theoretical basic machine.

8. The method of claim 7 wherein said active settings comprise modified roll (Ra), helical motion (Xb), vertical motion (Em), modified eccentricity (S), modified cone distance (Xp), modified tilt (Pi), modified swivel (Pj), modified cutter head axial adjustment (Xc), and, modified root angle (Σ).

9. The method of claim 8 wherein said active setting function for said modified eccentricity (S), said modified tilt (Pi), said modified cutter head axial adjustment (Xc), and said modified swivel (Pj) is defined by:

$$AS = AS_0 + AS_1 * \Delta\theta + \frac{AS_2}{2} * \Delta\theta^2 + \frac{AS_3}{6} * \Delta\theta^3 + \frac{AS_4}{24} * \Delta\theta^4$$

$$VAS = \left( AS_1 + AS_2 * \Delta\theta + \frac{AS_3}{2} * \Delta\theta^2 + \frac{AS_4}{6} * \Delta\theta^3 \right) * \Omega_T$$

wherein:

AS=the particular active setting,

VAS=the first derivative of the active setting, $AS_0, AS_1, \ldots$ =coefficients to control the relationship between the tool and work gear, Δθ=lead motion, and, $\Omega_T$=velocity of lead motion.

10. The method of claim 8 wherein said active setting function for said helical motion (Xb), said vertical motion (Em), said modified cone distance (Xp), and, said modified root angle (Σ) is defined by:

$$AS = AS_0 + AS_1 * \Delta\theta + \frac{AS_2}{2} * \Delta\theta^2 + \frac{AS_3}{6} * \Delta\theta^3 + \frac{AS_4}{24} * \Delta\theta^4$$

$$VAS = AS_1 + AS_2 * \Delta\theta + \frac{AS_3}{2} * \Delta\theta^2 + \frac{AS_4}{6} * \Delta\theta^3$$

wherein:

AS=the particular active setting,

VAS=first derivative of active setting, $AS_0, AS_1, \ldots$ =coefficients to control the relationship between the tool and work gear, Δθ=lead motion.

11. The method of claim 8 wherein said active setting function for said ratio of roll (Ra) is defined by:

$$Ra = Ra_0 * \left( 1 - \frac{Ra_1}{2} * \Delta\theta - \frac{Ra_2}{6} * \Delta\theta^2 - \frac{Ra_3}{24} * \Delta\theta^3 - \frac{Ra_4}{120} * \Delta\theta^4 \right)$$

wherein:

Ra=the ratio of roll setting, $Ra_0, Ra_1, \ldots$ =coefficients to control the relationship between the tool and work gear, Δθ=lead motion.

12. The method of claim 1 wherein said controlled removal of stock material is a non-generating process.

13. The method of claim 12 wherein said active setting function is defined by:

$$AS = AS_0 + AS_1 * \Delta\theta + \frac{AS_2}{2} * \Delta\theta^2 + \frac{AS_3}{6} * \Delta\theta^3 + \frac{AS_4}{24} * \Delta\theta^4$$

$$VAS = \left( AS_1 + AS_2 * \Delta\theta + \frac{AS_3}{2} * \Delta\theta^2 + \frac{AS_4}{6} * \Delta\theta^3 \right) * \Omega_T$$

wherein:

AS=the particular active setting,

VAS=first derivative of active setting, $AS_0, AS_1, \ldots$ =coefficients to control the relationship between the tool and work gear, Δθ=lead motion.

$\Omega_T$=velocity of lead motion.

14. The method of claim 12 comprising at least four active theoretical basic machine settings.

15. The method of claim 14 wherein said active settings comprise at least one of modified work gear rotation position (Wg), helical motion (Xb), modified hypoid offset (Em), modified eccentricity (S), modified cone distance (Xp), modified tilt (Pi), modified swivel (Pj), modified cutter head axial adjustment (Xc), and, modified root angle (Σ).

16. The method of claim 15 wherein said active settings comprise helical motion (Xb), modified hypoid offset or vertical motion (Em), modified cone distance (Xp), and modified root angle (Σ).

17. The method of claim 15 wherein said active settings comprise helical motion (Xb), modified eccentricity (S), modified cone distance (Xp), and modified root angle (Σ).

18. The method of claim 1 wherein said work gear is a face hobbed gear having cycloidally extending tooth flank surfaces, said tool is a grinding wheel, and said functions describe a grinding path along said cycloidally extending tooth flank surfaces.

19. A method of producing flank surface modifications in gear teeth by controlled removal of stock material from a work gear with a tool, said method comprising:

providing a gear producing machine, said machine having a work gear rotatable about a work axis and a tool rotatable about a tool axis, said tool and said work gear being linearly movable with respect to one another along three mutually orthogonal axes and angularly about a pivot axis, providing a theoretical basic machine comprising a cradle and including a plurality of machine axes for relatively positioning and moving said tool and work gear with respect to one another, each of said axes representing a basic machine setting having a gear theoretical meaning, defining each of said plurality of machine settings as an active setting with each said active setting being represented by a function, defining a desired tooth flank surface modification by determining a set of coefficients for each of said active settings indicative of said modification, determining said function for each active setting based upon said coefficients for said each active setting, transforming each active setting function from said theoretical machine to the axes arrangement of said gear producing machine whereby active settings movement defined on said theoretical machine is carried out on one or more of the axes of said gear producing machine, removing stock material from said work gear with said tool on said gear producing machine in accordance with said active setting functions.

20. The method of claim 19 wherein said determining coefficients comprises selecting a plurality of identification points on said flank surface, the position of each of said points being described by a position value for each of said machine settings, and, determining said coefficients based on said position values.

21. The method of claim 19 wherein said identification points are located along a path of contact on said tooth flank surface.

22. The method of claim 19 wherein each said active function is a function to at least the second order.

23. The method of claim 19 wherein each said active function is a function to at least the fourth order.

24. The method of claim 19 wherein said controlled removal of stock material is a generating process.

25. The method of claim 24 comprising at least nine active theoretical basic machine settings.

26. The method of claim 25 wherein said active settings comprise at least one of modified roll (Ra), helical motion (Xb), vertical motion (Em), modified eccentricity (S), modified cone distance (Xp), modified tilt (Pi), modified swivel (Pj), modified cutter head axial adjustment (Xc), and, modified root angle (Σ).

27. The method of claim 26 wherein said active setting function for said modified eccentricity (S), said modified tilt (Pi), said modified cutter head axial adjustment (Xc), and said modified swivel (Pj) is defined by:

$$AS = AS_0 + AS_1 * \Delta\theta + \frac{AS_2}{2} * \Delta\theta^2 + \frac{AS_3}{6} * \Delta\theta^3 + \frac{AS_4}{24} * \Delta\theta^4$$

$$VAS = \left( AS_1 + AS_2 * \Delta\theta + \frac{AS_3}{2} * \Delta\theta^2 + \frac{AS_4}{6} * \Delta\theta^3 \right) * \Omega_T$$

wherein:

AS=the particular active setting,

VAS=first derivative of active setting, $AS_0, AS_1, \ldots$ =coefficients to control the relationship between the tool and work gear, Δθ=lead motion, and, $\Omega_T$=velocity of lead motion.

28. The method of claim 26 wherein said active setting function for said helical motion (Xb), said vertical motion (Em), said modified cone distance (Xp), and, said modified root angle (Σ) is defined by:

$$AS = AS_0 + AS_1 * \Delta\theta + \frac{AS_2}{2} * \Delta\theta^2 + \frac{AS_3}{6} * \Delta\theta^3 + \frac{AS_4}{24} * \Delta\theta^4$$

$$VAS = AS_1 + AS_2 * \Delta\theta + \frac{AS_3}{2} * \Delta\theta^2 + \frac{AS_4}{6} * \Delta\theta^3$$

wherein:

AS=the particular active setting,

VAS=first derivative of active setting, $AS_0, AS_1, \ldots$ =coefficients to control the relationship between the tool and work gear, Δθ=lead motion.

29. The method of claim 26 wherein said active setting function for said ratio of roll (Ra) is defined by:

$$Ra = Ra_0 * \left( 1 - \frac{Ra_1}{2} * \Delta\theta - \frac{Ra_2}{6} * \Delta\theta^2 - \frac{Ra_3}{24} * \Delta\theta^3 - \frac{Ra_4}{120} * \Delta\theta^4 \right)$$

wherein:

Ra=the ratio of roll setting, $Ra_0, Ra_1, \ldots$ =coefficients to control the relationship between the tool and work gear, Δθ=lead motion.

30. The method of claim 19 wherein said controlled removal of stock material is a non-generating process.

31. The method of claim 30 wherein said active setting function is defined by:

$$AS = AS_0 + AS_1 * \Delta\theta + \frac{AS_2}{2} * \Delta\theta^2 + \frac{AS_3}{6} * \Delta\theta^3 + \frac{AS_4}{24} * \Delta\theta^4$$

$$VAS = \left( AS_1 + AS_2 * \Delta\theta + \frac{AS_3}{2} * \Delta\theta^2 + \frac{AS_4}{6} * \Delta\theta^3 \right) * \Omega_T$$

wherein:

AS=the particular active setting,

VAS=first derivative of active setting, $AS_0, AS_1, \ldots$ =coefficients to control the relationship between the tool and work gear, Δθ=lead motion, and, $\Omega_T$=velocity of lead motion.

32. The method of claim 30 comprising at least four active thereotical basic machine settings.

33. The method of claim 32 wherein said active settings comprise modified work gear rotation position (Wg), helical motion (Xb), modified hypoid offset (Em), modified eccentricity (S), modified cone distance (Xp), modified tilt (Pi), modified swivel (Pj), modified cutter head axial adjustment (Xc), and modified root angle (Σ).

34. The method of claim 33 wherein said active settings comprise helical motion (Xb), modified hypoid offset or vertical motion (Em), modified cone distance (Xp), and modified root angle (Σ).

35. The method of claim 33 wherein said active settings comprise helical motion (Xb), modified eccentricity (S), modified cone distance (Xp), and modified root angle (Σ).

36. The method of claim 19 wherein said work gear is a face hobbed gear having cycloidally extending tooth flank surfaces, said tool is a grinding wheel, and said functions describe a grinding path along said cycloidally extending tooth flank surfaces.

37. A method of producing flank surface modifications in gear teeth by controlled removal of stock material from a work gear with a tool, said method comprising:

providing a gear producing machine, said machine having a work gear rotatable about a work axis and a tool rotatable about a tool axis, said tool and said work gear being movable with respect to one another along and/or about a plurality of axes, providing a theoretical basic machine comprising a cradle and including a plurality of machine axes for relatively positioning and moving said tool and work gear with respect to one another, each of said axes representing a basic machine setting having a gear theoretical meaning, defining each of said plurality of machine settings as an active setting with each said active setting being represented by a function, providing a tooth flank surface comprising a plurality of lengthwise extending surface sections, defining a desired tooth flank surface modification in each section by determining a set of coefficients for each of said active settings indicative of said modification in each section, determining said function for each active setting based upon said coefficients for said each active setting in each section, transforming each active setting function for each section from said theoretical machine to the axes arrangement of said gear producing machine whereby active settings movement defined on said theoretical machine is carried out on one or more of the axes of said gear producing machine, removing stock material from each said section of said work gear with said tool in accordance with said active setting functions.

38. The method of claim 37 wherein said determining coefficients in each section comprises selecting a plurality of identification points on said flank surface in said each section, the position of each of said points being described by a position value for each of said machine settings, and, determining said coefficients based on said position values.

39. The method of claim 38 wherein said identification points are located along a path of contact on said tooth flank surface.

40. The method of claim 38 wherein each said active function is a function to at least the second order.

41. The method of claim 40 wherein each said active function is a function to at least the fourth order.

42. The method of claim 38 wherein each said section comprises the same number of identification points.

43. The method of claim 38 wherein not all sections comprise the same number of identification points.

44. The method of claim 38 wherein an ending point in one section is coincident with a beginning point in an adjacent section.

45. The method of claim 38 wherein an ending point in one section is not coincident with a beginning point in an adjacent section.

46. The method of claim 38 wherein an ending portion of a function in one section overlaps the beginning portion of a function in an adjacent section.

* * * * *